United States Patent [19]
Pensavecchia et al.

[11] Patent Number: 5,453,777
[45] Date of Patent: Sep. 26, 1995

[54] METHOD AND APPARATUS FOR CORRECTING AND ADJUSTING DIGITAL IMAGE OUTPUT

[75] Inventors: Frank G. Pensavecchia, Hudson; John F. Kline, Londonderry; Stephen M. LaPonsey, Merrimack, all of N.H.

[73] Assignee: Presstek, Inc., Hudson, N.H.

[21] Appl. No.: 46,085

[22] Filed: Apr. 12, 1993

[51] Int. Cl.⁶ .................... B41J 2/45; H04N 1/23
[52] U.S. Cl. .................. 347/234; 347/238; 358/300
[58] Field of Search .................. 346/107 R, 107 A, 346/155, 160; 358/302, 296, 300; 355/228; 347/19, 234, 235, 237, 41, 130, 238, 233, 142

[56] References Cited

U.S. PATENT DOCUMENTS

| | | | |
|---|---|---|---|
| 4,739,416 | 4/1988 | Manian | 358/302 |
| 4,751,522 | 6/1988 | Henzi et al. | 346/107 R |
| 4,801,950 | 1/1989 | Frehling | 358/302 X |
| 4,814,886 | 3/1989 | Kuge et al. | 358/298 X |
| 4,878,063 | 10/1989 | Katerberg | 347/19 |
| 5,274,394 | 12/1993 | Corona et al. | 346/107 R X |
| 5,291,248 | 3/1994 | Isobe | 355/228 |

FOREIGN PATENT DOCUMENTS

| | | |
|---|---|---|
| 0186508 | 7/1986 | European Pat. Off. . |
| 0412036 | 2/1991 | European Pat. Off. . |
| 0507328 | 10/1992 | European Pat. Off. . |
| 0517543 | 12/1992 | European Pat. Off. . |
| 2095867 | 4/1992 | Japan . |

Primary Examiner—Benjamin R. Fuller
Assistant Examiner—David Yockey
Attorney, Agent, or Firm—Cesari & McKenna

[57] ABSTRACT

In a digital imaging system including an array of imaging devices that image a substrate in a lateral series of adjacent longitudinal swaths, methods and apparatus for correcting device offset and hiding between regions imaged by adjacent devices. Along the direction of imaging (i.e., the dimension along which the imaging device(s) and the substrate move relative to one another during an imaging pass), adjustments take the form of compensating increases or decreases to the normal intervals between discharges to adjacent image points. Transverse to the direction of imaging, the invention compensates for imprecise device orientation and "seam" artifacts by, first, commencing imaging with the device having the greatest offset from proper orientation, and second, as a fine adjustment, repeating at least one imaging swath to produce intentional transverse overlap between adjacent swaths.

9 Claims, 2 Drawing Sheets

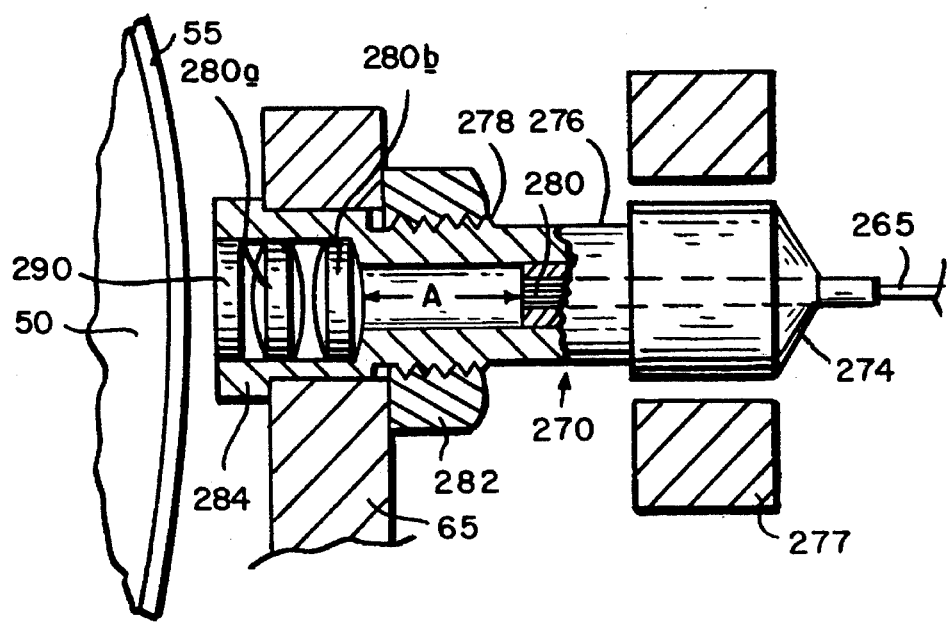
FIG. 4
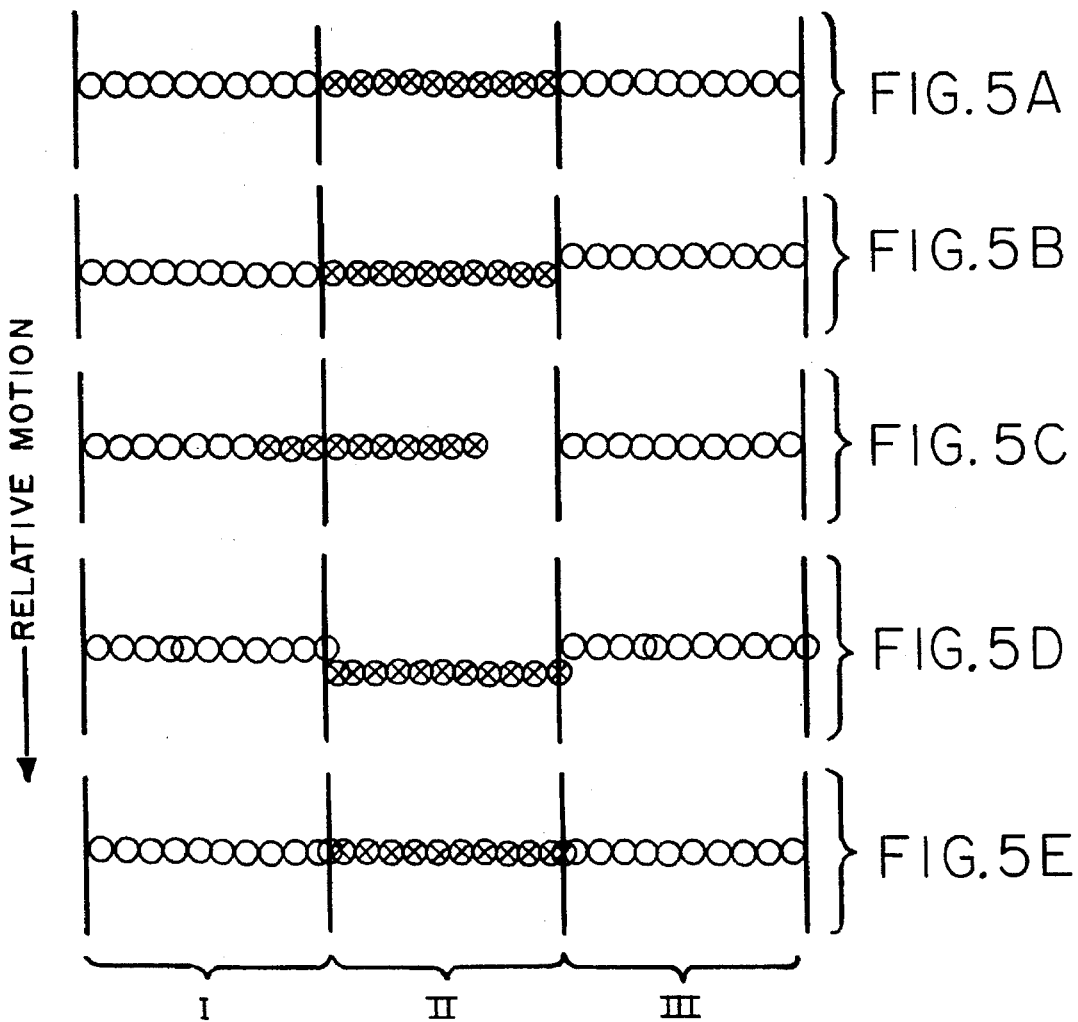

METHOD AND APPARATUS FOR CORRECTING AND ADJUSTING DIGITAL IMAGE OUTPUT

BACKGROUND OF THE INVENTION

A. Field of the Invention

The present invention relates to digital imaging, and in particular to control systems for processing digitally stored images prior to output to imaging devices.

B. Description of the Related Art

Various methods and technologies exist for encoding images digitally and transferring the digital representations to output devices. At the encoding stage, these range from hobbyist scanners and graphic-arts software to elaborate prepress systems, and at the output stage can include laser printing, digital exposure of photographic films, and transfer of the image to lithographic plates for subsequent mass-quantity printing. In the latter case, suitable techniques of plate production include the use of electromagnetic-radiation pulses, produced by one or more laser or non-laser sources, to create physical or chemical changes at selected points of sensitized plate blanks, which are used (immediately or after exposure to conventional development processes) for planographic printing; ink-jet equipment used to selectively deposit ink-repellent or ink-accepting spots on plate blanks, also to produce planographic printing plates; and spark-discharge equipment, in which an electrode in contact with or spaced close to a plate blank produces electrical sparks to alter the characteristics of certain areas on a printing surface, thereby producing "dots" which collectively form a desired image. As used herein, the term "imaging device" includes radiation sources, ink-jet sources, electrodes and other known means of producing image spots on blank printing plates, and the term "discharge" means the image-forming emissions produced by these devices.

In a typical laser-based imaging configuration, laser output is provided directly to the surface of a substrate via lenses or other beam-guiding components, or transmitted to the surface from a remotely sited laser using a fiber-optic cable. A controller and associated positioning hardware maintains the beam output at a precise orientation with respect to the substrate surface, scans the output over the surface, and activates the laser at positions adjacent selected points or areas of the substrate. The controller responds to incoming image signals corresponding to the original document or picture being copied onto the substrate to produce a precise negative or positive image of that original. The image signals are stored as a bitmap data file on a computer. Such files may be generated by a raster image processor (RIP) or other suitable means. For example, a RIP can accept input data in page-description language, which defines all of the features required to be transferred onto the substrate, or as a combination of page-description language and one or more image data files. The bitmaps are constructed to define the hue of the color as well as screen frequencies and angles.

The imaging apparatus can be configured as a flatbed recorder or as a drum recorder, with the substrate mounted to the interior or exterior cylindrical surface of the drum. In the case of lithographic printing, the exterior drum design is more appropriate to use in situ, on a lithographic press, in which case the print cylinder itself constitutes the drum component of the recorder or plotter.

In the drum configuration, the requisite relative motion between the laser beam and the substrate is achieved by rotating the drum (and the substrate secured thereon) about its axis and moving the beam parallel to the rotation axis, thereby scanning the substrate circumferentially so the image "grows" in the axial direction. Alternatively, the beam can move parallel to the drum axis and, after each pass across the substrate, increment angularly so that the image on the substrate "grows" circumferentially. In both cases, after a complete scan by the beam, an image corresponding (positively or negatively) to the original document or picture will have been applied to the surface of the substrate.

Multiple imaging devices may be used to produce several lines of image spots simultaneously, with a corresponding increase in imaging speed. Regardless of the number of imaging devices used, their operation must be precisely controlled so that the discharges occur at the appropriate times to reach the intended dot locations on the printing surface. Each discharge source must be aligned with the substrate along longitudinal and lateral dimensions (corresponding to circumferential and axial directions in the case of drum imaging) at all points during a scan of the all candidate image points on the substrate, and, in the case of laser-based imaging, the beam must remain focused on the substrate for maximum energy-transfer efficiency.

Failure to maintain proper alignment along all relevant dimensions results in imaging inaccuracies and/or undesirable periodic artifacts that detract from the final image appearance. The consequences can be particularly acute in planographic printing contexts, since typical print jobs require sequential application of ink from several plates, each of which is vulnerable to image degradation if created digitally; the result is a cumulative aggregation of the imperfections associated with each plate. Laser imaging imposes perhaps the most demanding requirements, since adjustments along each of the three dimensions can result in introduction of distortions along the other dimensions.

Especially troublesome printing artifacts result from the use of multiple imaging devices. One class of artifact, described in U.S. Pat. No. 5,182,990 (the entire disclosure of which is hereby incorporated by reference), occurs in multiple-device discharge-type imaging systems when, for example, individual devices fail to image at the same intensity as other devices, the writing head is improperly oriented, or individual imaging devices within the head are improperly aligned. The solution taught in that patent calls for staggering with respect to one another the initial imaging positions of the writing heads assigned each plate. This strategy prevents artifacts caused by similarly situated elements within the heads from appearing at the same positions on the plates, and thereby reinforcing one another in the final printed image.

Another class of periodic artifact, not amenable to solution according to the techniques described in the '990 patent, occurs primarily with use of laser or other beam-type imaging devices as a result of imperfect registration between regions imaged by different devices. Misregistration produces uneven "seams" between the regions occurring along the direction of imaging, and which tend to be visible to the eye even when imaging takes place at high resolutions.

DESCRIPTION OF THE INVENTION

A. Brief Summary of the Invention

The present invention minimizes both imaging inaccuracies and artifacts by placing dimensional adjustments under digital, rather than mechanical control. Along the direction of imaging (i.e., the dimension along which the imaging device(s) and the substrate move relative to one another during an imaging pass), adjustments take the form of compensating increases or decreases to the normal intervals between discharges to adjacent image points. In other words, because the substrate and imaging devices travel with respect to one another, timewise adjustment to the discharge rate results in alteration of the on-plate distance between successive discharges.

Transverse to the direction of imaging, the present invention compensates for imprecise device orientation (which may be exacerbated by focusing of the device) and "seam" artifacts by, first, commencing imaging with the device having the greatest skew from proper orientation, and second, as a fine adjustment, repeating at least one longitudinal series of imaging pulses along the direction of imaging (an imaging "swath") to produce intentional transverse overlap between imaging swaths. The utility of the second adjustment stems from our observation that a viewer's eye tends to perceive printing gaps far more readily than it does printing overlap.

B. Brief Description of the Drawings The foregoing discussion will be understood more readily from the following detailed description of the invention, when taken in conjunction with the accompanying drawings, in which:

FIG. 4 is an enlarged, partial cutaway view of a lens element for focusing a laser beam from an optical fiber onto the surface of a substrate; and FIGS. 5A–5E illustrate the genesis of imaging inaccuracies and artifacts, and their amelioration according to the present invention.

C. Detailed Description of the Preferred Embodiments

To appreciate the operation and applicability of the present invention, it is necessary to place it in the context of a typical imaging environment. The following discussion assumes use of multiple laser-type imaging devices arranged linearly in a single writing head, as illustrated in FIG. 2, disposed on the cylinder-type imaging system shown in FIG. 1. This embodiment is exemplary only, since the apparatus and techniques of the present invention are useful in conjunction with a variety of alternative imaging configurations.

Figure 1:
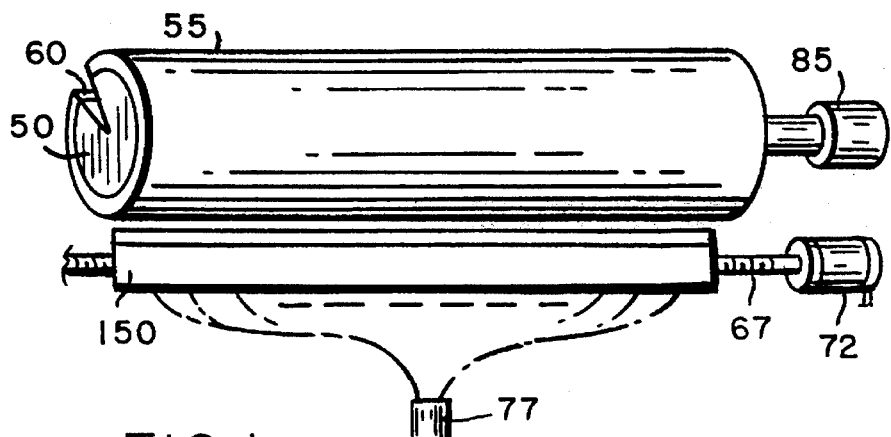
FIG. 1 is an isometric view of the cylindrical embodiment of an imaging apparatus to which the principles of the present invention may be applied, and which operates in conjunction with a linear-array writing array.
Figure 2:
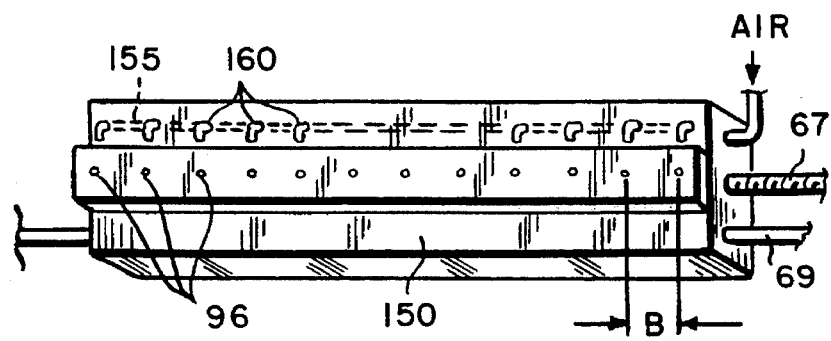
FIG. 2 is an isometric view of the front of a writing array as shown in FIG. 1.

The illustrative imaging environment of the present invention includes, as shown in FIG. 1, a cylinder 50 around which is wrapped a substrate (e.g., a lithographic plate blank) 55. Cylinder 50 includes a void segment 60, within which the outside margins of substrate 55 are secured by conventional clamping means (not shown) or other suitable retention mechanism. We note that the size of the void segment can vary greatly depending on the environment in which cylinder 50 is employed.

If desired, cylinder 50 is straightforwardly incorporated into the design of a conventional lithographic press, and serves as the plate cylinder of the press. In a typical press construction, where substrate 55 is a plate blank, the plate 55 receives ink from an ink train, whose terminal cylinder is in rolling engagement with cylinder 50. The latter cylinder also rotates in contact with a blanket cylinder, which transfers ink to the recording medium. The press may have more than one such printing assembly arranged in a linear array. Alternatively, a plurality of assemblies may be arranged about a large central impression cylinder in rolling engagement with all of the blanket cylinders.

The recording medium is mounted to the surface of the impression cylinder, and passes through the nip between that cylinder and each of the blanket cylinders. Suitable central-impression and in-line press configurations are described in U.S. Pat. Nos. 5,163,368 and 4,911,075 (both commonly owned with the present application and hereby incorporated by reference).

Cylinder 50 is supported in a frame and rotated by a standard electric motor or other conventional means. The angular position of cylinder 50 is monitored by a position detector or shaft encoder 85, as described in further detail below. A writing array 150, mounted for movement on a lead screw 67 and a guide bar 69, traverses substrate 55 as it rotates. Axial movement of writing array 65 results from rotation of a stepper motor 72, which turns lead screw 67 and thereby shifts the axial position of writing array 55. Stepper motor 72 is activated during the time writing array 65 is positioned over void 60, after writing array 65 has passed over the entire surface of substrate 55. The rotation of stepper motor 72 shifts writing array 65 to the appropriate axial location to begin the next imaging pass.

Figure 3:
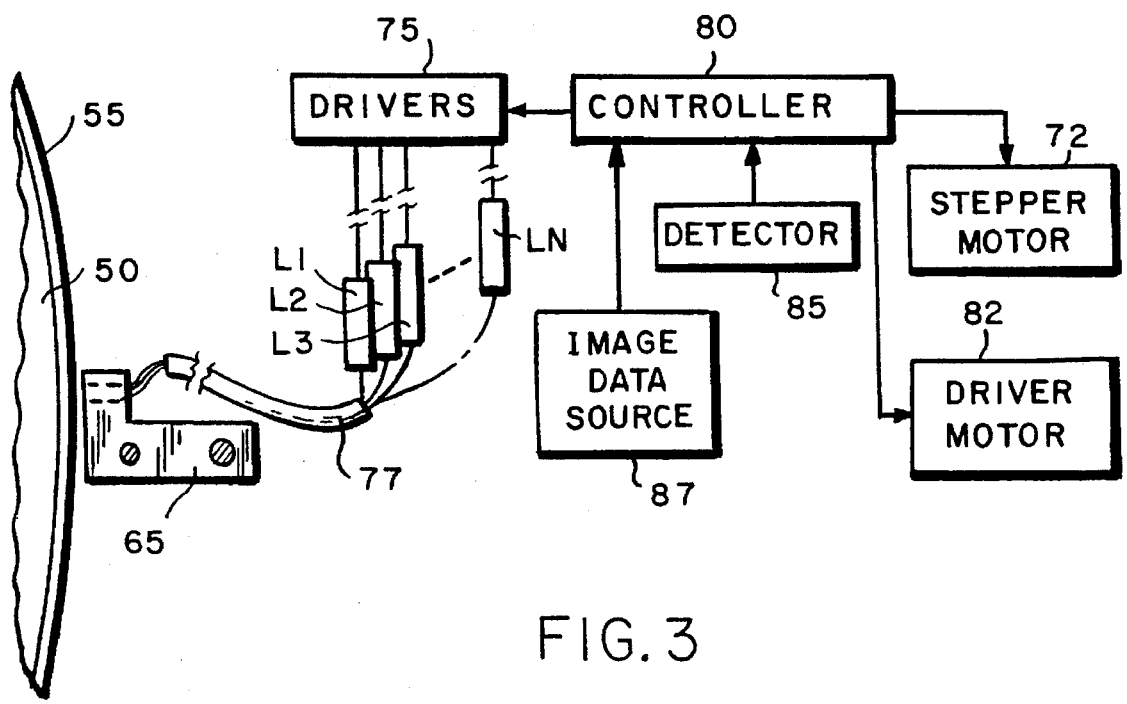
FIG. 3 is a schematic depiction of the imaging apparatus shown in FIG. 1, and which illustrates in greater detail its mechanism of operation.

As shown in FIG. 3, a series of laser sources $L_1$, $L_2$, $L_3$ ... $L_n$, driven by suitable laser drivers collectively designated by reference numeral 75, each provide output to a fiber-optic cable 77. The cable leads to a writing head 150, illustrated in detail in FIG. 2, which comprises a long linear body and a series of output assemblies 96 (described below) each fed by a fiber-optic cable drawn from bundle 77. The interior of writing array 150, or some portion thereof, contains threads that engage lead screw 67, rotation of which advances writing array 150 along substrate 55. Individual lens assemblies 96 are evenly spaced a distance B from one another. Distance B corresponds to the difference between the axial length of substrate 55 and the distance between the first and last lens assembly; it represents the total axial distance traversed by writing array 150 during the course of a complete scan. Each time writing array 150 encounters void 60, stepper motor 72 rotates to advance writing array 150 an axial distance equal to the desired distance between imaging passes (i.e., the diameter of a print dot).

Return now to FIG. 3, which schematically depicts the organization or the control and drive apparatus. A controller 80 actuates laser drivers 75 when the associated lasers reach appropriate points opposite substrate 55, and in addition operates stepper motor 72 and the cylinder drive motor (not shown). Controller 80 receives data from two sources. The angular position of cylinder 50 with respect to writing array 65 is constantly monitored by detector 85, which provides signals indicative of that position to controller 80. The controller also contains a swath counter, which increments with each imaging pass, to provide an axial dimension to the angular position and thereby fully specify the position of each imaging element with respect to the surface of substrate 55. The second source of data, labeled IMAGE DATA SOURCE and indicated by reference numeral 87 in FIG. 3, is a computer on which is stored an image bitmap whose pixel density corresponds (or can be processed so as to correspond) to the substrate image density, and which also provides data signals to controller 80. The image data define points on substrate 55 where image spots are to be written. Controller 80, therefore, correlates the instantaneous relative positions of writing array 65 and substrate 55 (as reported by detector 85) with the image data to actuate the appropriate laser drivers at the proper times during scan of substrate 55. The control circuitry required to implement this scheme is well-known in the scanner and plotter art; a suitable design is described in the '990 patent.

The laser output cables terminate in lens assemblies, mounted within writing array 65, that precisely focus the beams onto the surface of substrate 55. An illustrative lens-assembly design is described below; for purposes of the present discussion, these assemblies are generically indicated by reference numeral 96. An air manifold 155, connected to a source of pressurized air, contains a series of outlet ports 160 aligned with lens assemblies 96. Introduction of air into the manifold 155 and its discharge through the outlet ports 160 protects and cleans the lenses of airborne debris during operation, and also purges fine-particle aerosols and mists from the region between lens assemblies 96 and substrate surface 55.

Controller 80 either receives image data already arranged into vertical columns, each corresponding to a different lens assembly, or can progressively sample, in columnar fashion, the contents of a database containing a complete bitmap representation of the image to be transferred. In either case, controller 80 recognizes the different relative positions of the lens assemblies with respect to substrate 55 and actuates the appropriate laser only when its associated lens assembly is positioned over a point to be imaged.

Illustrative means for guiding laser output to the surface of a plate blank is shown in FIG. 4. Incoming laser radiation from a fiber-optic cable 265 (itself drawn from bundle 77) is guided by the depicted assembly to focus on the surface of substrate 55. The assembly, indicated generically by reference numeral 270, receives the fiber-optic cable through a terminus 274, fixedly engaged to a generally tubular body 276, and contained within and rotated by a stepper motor (the exterior body of which is shown in section and indicated by reference numeral 277). Stepper motor 277 is mounted so as to permit axial movement toward and away from substrate 55.

Mounted within the forepart of body 276 are two or more focusing lenses 280a, 280b. Cable 265 is carried partway through body 276 by a sleeve 280. Body 276 defines a hollow channel between inner lens 280b and the terminus of sleeve 280, so the end face of cable 265 lies a selected distance A from inner lens 280b. The distance A and the focal lengths of lenses 280a, 280b are chosen so that, at normal working distance from substrate 55, the beam emanating from cable 265 will be precisely focused on the substrate surface. This distance can be altered to vary the size of an image feature.

In the illustrated embodiment, which facilitates electronically controlled adjustment of distance, body 276 contains a series of threads 278 which engage a complementary threaded extension 282 of writing array 65. Rotation of body 276 by stepper motor 277 advances assembly 270 toward or away from substrate 55 as a result of the threaded engagement between body 276 and writing-array extension 282, which remains in fixed orientation with respect to substrate 55. Excessive rearward movement is prevented (and a useful calibration baseline provided) by a flange 284 of body 276 (and which may, optionally, contain a transparent window 290 to protect the lenses from debris and possible damage). In this manner, the beam emanating from assembly 270 may be precisely focused on substrate 55.

It should be understood that the foregoing mechanism for altering the distance between a lens element and the substrate surface is only one of many suitable designs. Those skilled in the art will recognize the utility of various alternatives, such as telescoping arrangements or rack-and-pinion assemblies, which may or may not be electronically controlled. For example, body 276 can be secured to writing array 65 by a nut that engages threads 278 and secures flange 284 of body 276 against the outer face of writing array 65, and which is adjusted only once during manufacture.

The configuration shown in FIG. 4 also illustrates the manner in which imaging errors may be introduced as a consequence of imperfect lens orientation. Each lens assembly is, of course, secured within writing array 65 as square as possible with respect to cylinder 50. In practice, however, it is quite difficult to avoid a slight cant, and the small feature sizes typical of current digital imaging apparatus—on the order of 0.5 to 2 mils—render even miniscule eccentricities problematic.

Refer to FIG. 5A, which illustrates, in exemplary fashion, a series of three collinear rows of image dots imparted by three adjacently located lens assemblies disposed within a writing array as shown in FIGS. 1 and 2. (For clarity, image dots attributable to the first and third lens assemblies are indicated by open circles, and those attributable to the central lens assembly appear as crossed circles.) The width of each of the regions I, II and III, corresponding to areas in which each of the first, second and third lens assemblies operate, is equal to the distance between assemblies. Once again assuming that the substrate is imaged on a rotating cylinder (with the indicated relative motion) and that orientation of all three lens assemblies is hypothetically precise, the result of each assembly imaging, within its area of operation, every available point along equivalent longitudinal positions is a perfectly straight, continuous line extending through all three regions.

Suppose, however, that the third lens assembly is canted upward relative to the first and third lens assemblies. In that case the dots in the third region will be displaced longitudinally upward relative to dots in the other two regions instead of collinear therewith, as shown in FIG. 5B. This is a result of dimensional mismatch between the substrate position communicated by detector 85 and the actual position imaged by the third lens assembly. A mechanical correction to this defect might be attempted, for example, by reorienting the assembly; however, even if such an extremely fine adjustment could be introduced, it would likely disturb the lens focus, and the process of refocusing may reintroduce new eccentricity. It is, therefore, impractical to rely on mechanical adjustments to correct small defects in imaging accuracy.

Accordingly, we take advantage of the relative movement between the substrate and the lens assemblies to electronically delay or advance activation of the laser associated with the third lens assembly, thereby shifting the longitudinal substrate position at which it applies an image dot. Because the eccentric displacement of the third lens assembly is a permanent feature and does not vary with position or time, a single time delay or advancement associated with that imaging element is sufficient to eliminate the effect of the defect.

In practice, all image elements are likely to be at least slightly offset with respect to one another. To fully implement the above-described technique of timewise correction, one first selects any of the devices (preferably the one with the smallest longitudinal deviation or one with average deviation) as the baseline, and then introduces the timing delays or advancements necessary to bring each of the other devices into longitudinal congruence with the baseline device as permanent features associated with those other devices. For example, controller 80 may contain separate dedicated modules each corresponding to a particular driver, in which case the appropriate timewise offset is stored with respect to each module and applied, on an individual basis, to the unitary information obtained from detector 85, so that each module effectively operates as if coupled to a customized detector.

Now suppose that, instead of a longitudinal displacement, one of the devices is offset laterally. The result is shown in FIG. 5C, where the output of the second lens assembly is shifted to the left a distance equal to three dot diameters. The first three image dots from the second device appear at the final three dot positions of region I, and the last three dot positions of region II remain unimaged. The digital adjustment to correct this inaccuracy is performed in two stages.

The first stage rectifies lateral position errors greater than half a dot diameter by activating laterally displaced imaging devices at different imaging passes (cylinder rotations) relative to properly oriented devices. Thus, to compensate for the positioning error whose results appear in FIG. 5C, the second device does not commence imaging until the first and third devices have completed their initial three swaths (i.e., after the third cylinder rotation). The result, of course, is an overall increase in imaging time equal to the number of additional swaths necessary to complete imaging in some regions. This difference represents a negligible portion of the total number of swaths required for a complete image.

More generally, the number of imaging swaths that should be skipped by an imaging device laterally offset in the direction opposite that of (lateral) device movement to properly orient the first swath of that device is the integral round-off of n, where n is the number of swath widths by which the device is laterally offset. For example, if a device is improperly oriented such that its output reaches the substrate a distance from true equal to 2.75 swath widths, three imaging swaths (i.e., cylinder rotations) are skipped, and the offset device begins imaging at the fourth cylinder rotation. For devices laterally offset in the direction of device movement, it is conceptually simplest to consider the most offset device as a baseline, and treat the remaining devices as offset— even if they are, in fact, square with the substrate—with respect to that device.

This lateral offset may be effected by adjustments to the settings of controller 80. For example, in the case where controller 80 contains separate dedicated modules each corresponding to a particular driver, an index equal to the number of necessary swath displacements for a given driver is introduced into the counter associated with that driver, so the location of the first imaging swath is laterally incremented or decremented by the index.

This approach reduces the maximum lateral error to half a dot diameter. This magnitude of error, we have found, is visually undetectable (and therefore irrelevant) so long as it creates an overlap condition rather than a gap. Nonetheless, it remains possible that following application of the above correction technique, a gap at one end of an imaging region will still exist. As a result, further adjustment is necessary.

This adjustment takes the form of an extra imaging swath axially displaced by less than one (and preferably half) a dot diameter with respect to the previous swath, followed by continued imaging from the extra swath onward. Preferably, the image data specifying which points along the swath are to be imaged is identical to that of the previous (overlap) swath. In that case stepper motor 72 is caused to step half the ordinary angular displacement, all imaging devices repeat their previous swaths, and imaging then proceeds normally.

Because it is assumed that the coarse lateral adjustment described previously has been applied to at least one of the imaging devices, it is important that the extra swath—which is executed by all imaging devices simultaneously—be introduced only after all devices have begun imaging (since at least one will have been delayed). Thus, in order to ensure that all imaging elements execute the extra swath, it occurs just after the first swath imaged by the last-to-begin imaging device.

The result of the correction is shown in FIG. 5D. For clarity of presentation, it is assumed that the row of dots imaged by the second device is intentionally displaced longitudinally by a distance equal to one dot diameter with respect to the other two rows. In this case, since the second device does not begin imaging until the fourth absolute cylinder rotation, the extra swath is inserted at the fifth absolute rotation. The result is a dot overlap at the fourth dots imaged by the first and third devices, and at the first dot imaged by the second device.

This overlap technique is most conveniently implemented on the configuration described above through the use of buffer memory and a system monitor within controller 80. While controller modules corresponding to individual imaging devices may operate independently, control of stepper motor 72 remains under the control of a system monitor module. The system monitor detects the cylinder rotation during which the last-to-image assembly delivers its first imaging swath, and increments stepper motor 72 by half its normal angular displacement at the conclusion of that swath.

Ordinarily, in the case of separate dedicated controller modules, each module will contain a discrete memory buffer to store image data corresponding to at least one swath. By placing transfer of data from image data source 87 to the buffers under the control of the system monitor, it is possible to configure that module to suppress data transfer to all driver modules prior to the displacement swath, thereby causing all drivers to repeat application of the previous swaths.

This overlap technique also results in elimination of seams between imaging regions. Accordingly, its implementation is valuable separate and apart from adjustment to off-square heads. Indeed, if head correction is not an issue, overlap can be used to hide seams up to a full dot diameter in width. Refer to FIG. 5E, which shows the results of applying the half-dot displacement at the end of an imaging region (i.e., after all imaging devices have completed their last swaths). The final, displaced swath is applied precisely along the seam line, creating adjacence or overlap with image dots separated from the seam line by as much as a half dot diameter.

It will therefore be seen that we have invented a highly versatile and useful digital system for correcting the output of electronically actuated imaging devices. The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of correcting imaging errors in a digital imaging system, said system including an array of imaging devices, means for bearing a substrate to be imaged by the imaging devices, and means for causing relative movement between the imaging devices and the substrate-bearing means to effect a scan of the substrate by the imaging devices in a lateral series of adjacent longitudinal swaths, each of the swaths having a swath width and the imaging errors being due to a lateral offset of at least one of said devices with respect to at least one other of said devices, the method comprising the steps of:

a. selecting one of said devices as a baseline device;
   b. causing each of at least some of said devices including the baseline device to image a plurality of swaths including a first swath;
   c. preventing any of said at least one of said laterally offset devices offset by a displacement having a magnitude greater than the width of one of said swaths from imaging the first swath until the baseline device has imaged a number of swaths equal to a round-off of n to a nearest integer, where n corresponds to said magnitude, expressed in swath widths;
   d. after all of said devices have image at least the first swath, advancing the array a lateral distance of less than one said swath width and causing each of said devices to repeat a previous one of the swaths, thereby correcting imaging errors by producing an overlap among swaths; and
   e. causing the devices to image successive swaths after said first swath until the substrate has been scanned.

2. The method of claim 1 wherein, after all of said devices have imaged the first swath, the array is advanced a lateral distance of up to one-half a swath width.

3. A method of hiding seams produced by a digital imaging system, said system including an array of imaging devices, means for bearing a substrate to be imaged by the imaging devices, and means for causing relative movement between the imaging devices and the substrate-bearing means to effect a scan of the substrate by the imaging devices in a lateral series of adjacent longitudinal swaths, each of the swaths having a width and the seams occurring between swaths imaged by adjacent ones of said devices, the method comprising the steps of:

a. causing said devices to image successive swaths until the substrate has been scanned;
   b. advancing the array a lateral distance of less than one swath width and causing each of said devices to repeat a previous one of the swaths, thereby hiding seams between regions.

4. The method of claim 3 wherein, after the substrate has been scanned, the array is advanced a lateral distance of one-half a swath width.

5. A method of correcting imaging errors in a digital imaging system, said system including an array of imaging devices, means for bearing a substrate to be imaged by the imaging devices, and means for causing relative movement between the imaging devices and the substrate-bearing means to effect a scan of the substrate by the imaging devices in a lateral series of adjacent longitudinal swaths, each of the swaths having a swath width and the imaging errors being due to a lateral and longitudinal offsets of at least one of said devices offset with respect to at least one other of said devices, the method comprising the steps of:

a. selecting one of said devices as a longitudinal baseline device;
   b. selecting one of said devices as a lateral baseline device;
   c. causing each of said devices to image a plurality of swaths including a first swath;
   d. delaying or advancing imaging of each of the swaths for any of said devices having a longitudinal offset relative to the longitudinal baseline device by an amount of time corresponding to the offset;
   e. preventing any of said at least one of said laterally offset devices offset by a displacement having a magnitude greater than the width of one of said swaths from imaging the first swath until the lateral baseline device has imaged a number of swaths equal to a round-off of n to a nearest integer, where n corresponds to said magnitude, expressed in swath widths;
   f. after all of said devices have image at least the first swath, advancing the array a lateral distance of less than one said swath width and causing each of said devices to repeat a previous one of the swaths, thereby correcting lateral imaging errors by producing an overlap among swaths; and
   g. causing the devices to image successive swaths after said first swath until the substrate has been scanned.

6. The method of claim 5 wherein, after all of said devices have imaged the first swath, the array is advanced a lateral distance of up to one-half a swath width.

7. A digital imaging system comprising:

a. an array of imaging devices;
   b. means for bearing a substrate to be imaged by the imaging devices;
   c. means for causing relative movement between the imaging devices and the substrate-bearing means to effect a scan of a substrate by the imaging devices, each of the devices forming a series of laterally adjacent longitudinal imaging swaths including a first imaging swath, each of the swaths having a swath width; and
   d. control means for selectively causing the devices to discharge in an imagewise pattern during the scan; wherein the control means includes:
   e. means for delaying, for each of said devices laterally offset with respect to a baseline device by a displacement having a magnitude greater than one said swath width, the first imaging swath until the baseline device has imaged a number of swaths equal to a round-off of n to a nearest integer, where n corresponds to said magnitude, expressed in swath widths;
   f. means for causing the array to be advanced a lateral distance of less than one said swath width and causing all of said devices to repeat a previous one of the imaging swaths after all of the devices have imaged at least the first imaging swath, thereby producing an overlap among imaging swaths; and
   g. causing the devices to image successive swaths after said first swath until the substrate has been scanned.

8. The system of claim 7 wherein the imaging devices are lasers.

9. The system of claim 8 wherein the lasers produce output that is guided through lens assemblies mounted within the array.

* * * * *